March 24, 1964  T. L. HANSON ETAL  3,125,945
COFFEE VENDING MACHINE HAVING SINGLE CUP BREWING MECHANISM
Filed Oct. 28, 1960  7 Sheets-Sheet 2

Fig.2.

INVENTORS.
Theodore L. Hanson
George C. Bell
Charley Ward Hunter
BY Hovey, Schmidt, Johnson & Hovey
ATTORNEYS.

March 24, 1964 T. L. HANSON ETAL 3,125,945
COFFEE VENDING MACHINE HAVING SINGLE CUP BREWING MECHANISM
Filed Oct. 28, 1960 7 Sheets-Sheet 3

Fig.3.

INVENTORS.
Theodore L. Hanson
George C. Bell
BY Charley Ward Hunter

Hovey, Schmidt, Johnson & Hovey
ATTORNEYS.

March 24, 1964     T. L. HANSON ETAL     3,125,945
COFFEE VENDING MACHINE HAVING SINGLE CUP BREWING MECHANISM
Filed Oct. 28, 1960     7 Sheets-Sheet 5

INVENTORS.
Theodore L. Hanson
George C. Bell
Charley Ward Hunter
BY
ATTORNEYS.

March 24, 1964  T. L. HANSON ETAL  3,125,945
COFFEE VENDING MACHINE HAVING SINGLE CUP BREWING MECHANISM
Filed Oct. 28, 1960  7 Sheets-Sheet 6

INVENTORS.
Theodore L. Hanson
George C. Bell
Charley Ward Hunter
BY
Hovey, Schmidt, Johnson & Hovey
ATTORNEYS.

March 24, 1964     T. L. HANSON ETAL     3,125,945

COFFEE VENDING MACHINE HAVING SINGLE CUP BREWING MECHANISM

Filed Oct. 28, 1960     7 Sheets-Sheet 7

Fig.16.

INVENTORS.
Theodore L. Hanson
BY George C. Bell
Charley Ward Hunter

Hovey, Schmidt, Johnson & Hovey
ATTORNEYS

United States Patent Office 3,125,945
Patented Mar. 24, 1964

1

3,125,945
COFFEE VENDING MACHINE HAVING SINGLE
CUP BREWING MECHANISM
Theodore L. Hanson, Kansas City, George C. Bell, Independence, and Charley Ward Hunter, Raytown, Mo., assignors to The Vendo Company, Kansas City, Mo., a corporation of Missouri
Filed Oct. 28, 1960, Ser. No. 65,808
20 Claims. (Cl. 99—289)

This invention relates to beverage brewing apparatus, and particularly, to a vending machine having novel structure for preparing single cups of freshly brewed coffee in response to deposit of coinage of predetermined value in the machine.

Attempts have previously been made in the automatic merchandising field to provide coffee vending machines capable of preparing single cups of freshly brewed coffee, but the prior attempts have not been satisfactory from many standpoints because of the failure to obtain a coffee extract of proper flavor and aroma with a machine of commercially practicable cost. The provision of instant coffee substances which are substantially fully soluble in water, appeared to present an answer to the problem of dispensing of single cups of coffee from automatic vending equipment, but it was soon determined that the coffee prepared in this manner did not have the same flavor and aroma of freshly brewed coffee, wherein the brewing liquid is passed through ground coffee to extract various constituents therein to produce the final coffee product.

However, fresh brewing of each single cup of coffee was believed to be impractical because of the necessity of passing the brewing water through the ground coffee only one time in order to provide substantially instantaneous preparation of the coffee extract, and furthermore, the necessity of employing mechanism for removing the coffee grounds from the brewing mechanism immediately after preparation of the single cup of coffee. Experimental models attempting to solve the problems outlined above, involved machines of relatively massive size and, thereby impractical for commercial installation, and furthermore, employed components which were too expensive to permit manufacture of a unit which would be widely accepted in the automatic vending field.

It is, therefore, the primary object of the present invention to provide a vending machine having novel mechanism for brewing single cups of freshly prepared coffee with the brewing operation being carried out at a minimum of cost, in a relatively short period of time and with the entire machine of conventional size and capable of being manufactured at a price competitive to other coffee vending units employing different principles.

It is a further significant object of the instant invention to provide single cup brewing apparatus for coffee vending machines wherein the brewing assembly includes a rotatable drum having a ground coffee recess in the outer periphery thereof so that the brewing operation may be carried out by the simple expedient of rotating the drum through a predetermined cycle so that ground coffee is introduced into the recess in the drum at one position of the latter, hot water is passed through the ground coffee in the recess at another position of the drum with the coffee extract being directed to a cup at a delivery station in the machine, and including means for removing

2 the coffee grounds from the drum at another location of the same whereby the entire brewing cycle may be completed upon one revolution of the drum.

A further important aim of the instant invention is to provide single cup brewing apparatus for coffee vending machines wherein coffee of suitable strength may be prepared by passing hot liquid through the ground coffee only one time and with maximum removal of the constituents therefrom being obtained by virtue of the fact that the present brewing mechanism permits utilization of coffee of much finer grind than heretofore used, and without the coffee grounds being delivered to the customer in the cup by virtue of improved filtering means through which the extracted coffee must pass prior to delivery into the cup at the point of delivery of the coffee to the customer.

Also an important object of the invention is to provide a coffee vending machine of the type described, wherein the hot brewing liquid is introduced into the rotatable drum axially thereof for ultimate passage through the ground coffee in the recess in the outer periphery of such drum, whereby the flow of liquid into the coffee brewing mechanism does not in any way interfere with normal rotation of the drum and water is also made available for flushing the coffee grounds out of the coffee recess in such rotatable unit when the recess is disposed at another location remote from the brewing position of the same.

Also another important object of the present invention is the provision of single cup brewing apparatus for coffee vending machines wherein is provided an improved brewing assembly positioned adjacent the periphery of the rotatable drum and at the brewing station for cooperating with the ground coffee recess in the drum to present a brewing chamber through which all of the liquid must pass in order to efficiently extract all valuable constituents from the ground coffee and thereby produce a product of maximum purity, flavor, aroma, and of predetermined strength.

In this respect, it is a further significant object of the invention to provide a coffee vending machine having single cup brewing mechanism therein, wherein the operation of the machine is entirely automatic, and it only being necessary for the customer to insert proper coinage and push a selector button for black coffee, coffee with cream, or coffee with cream and sugar.

A further object of the invention is to provide a coffee vending machine as referred to immediately above, wherein the only significant operator attention which is required is filling of the ground coffee hopper at predetermined intervals, and with the coffee brewing assembly remaining in a substantially sanitary condition throughout long periods of operation and thereby materially reducing the servicing operations required with other vending machines, and particularly those employing soluble coffee which dissolves in the hot water.

Other important objects of the invention include the provision of novel, mutually cooperable cam and hydraulic actuated means for forcing the brew assembly into liquid-tight engagement with the rotatable drum and in overlying relationship to the ground coffee receiving recess therein, so that water under considerable pressure, may be directed through the ground coffee to prepare a beverage of maximum desired characteristics and without any leakage of water from the brewing chamber which would result in the customer receiving less than a specified amount of coffee and also, necessitating frequent cleaning of the rotatable brewing drum and associated mechanism; to the provision of novel hydraulic actuated means for forcing the brew assembly into tight engagement with the periphery of the brew drum and in response to flow of water thereinto to prepare the beverage, with the pressure of the water being increased by power transformer means forming a part of the hydraulically actuated means to thereby assure firm engagement of the brewing assembly with the periphery of the drum, notwithstanding the pressure against the same by the water flowing through the ground coffee during the brewing cycle; to the provision of a coffee vending machine wherein brewing of the coffee from a relatively fine ground coffee product is rendered practicable because of the utilization of filter paper between the ground coffee and the coffee extract outlet of the brew assembly engaging the drum, whereby the coffee is forced to pass through the filter paper, thereby removing all solid materials from the latter and assuring a relatively foreign substance-free final product; to the provision of novel mechanism for placing a fresh stretch of the filter paper over the ground coffee receiving recess in the drum during each brewing cycle so that flow of liquid through the brewing chamber is substantially unrestricted and is not in any way hampered by coffee grounds from prior brewing cycles clogging the coffee extract outlet leading to the coffee delivery station; and to other important objects and details of construction of the present mechanism which will become obvious or be explained in greater detail as the following specification progresses.

In the drawings:

FIGURE 1 is a front elevational view of beverage brewing apparatus adapted to be incorporated in a coffee vending machine or the like;

FIG. 9 is a plan view of the brew element normally positioned in the ground coffee receiving recess in the rotatable drum of the present brewing apparatus;

FIG. 10 is a vertical, cross-sectional view taken on the irregular line 10—10 of FIG. 9 and looking in the direction of the arrows;

Beverage brewing apparatus embodying the preferred concepts of the present invention is illustrated in the drawings and broadly designated by the numeral 20. It is to be understood that apparatus 20 is to be positioned within a cabinet or the like, including water supply and heating means, structure for controlling flow of hot water through the system therefor, cup delivery mechanism for directing single cups to a coffee delivery station, coin mechanism for requiring coins of predetermined value to be inserted into the machine prior to customer actuation thereof, and means for disposing of waste water, coffee grounds, and other waste products, as will be made clear hereinafter.

Figures 1, 9, 10:
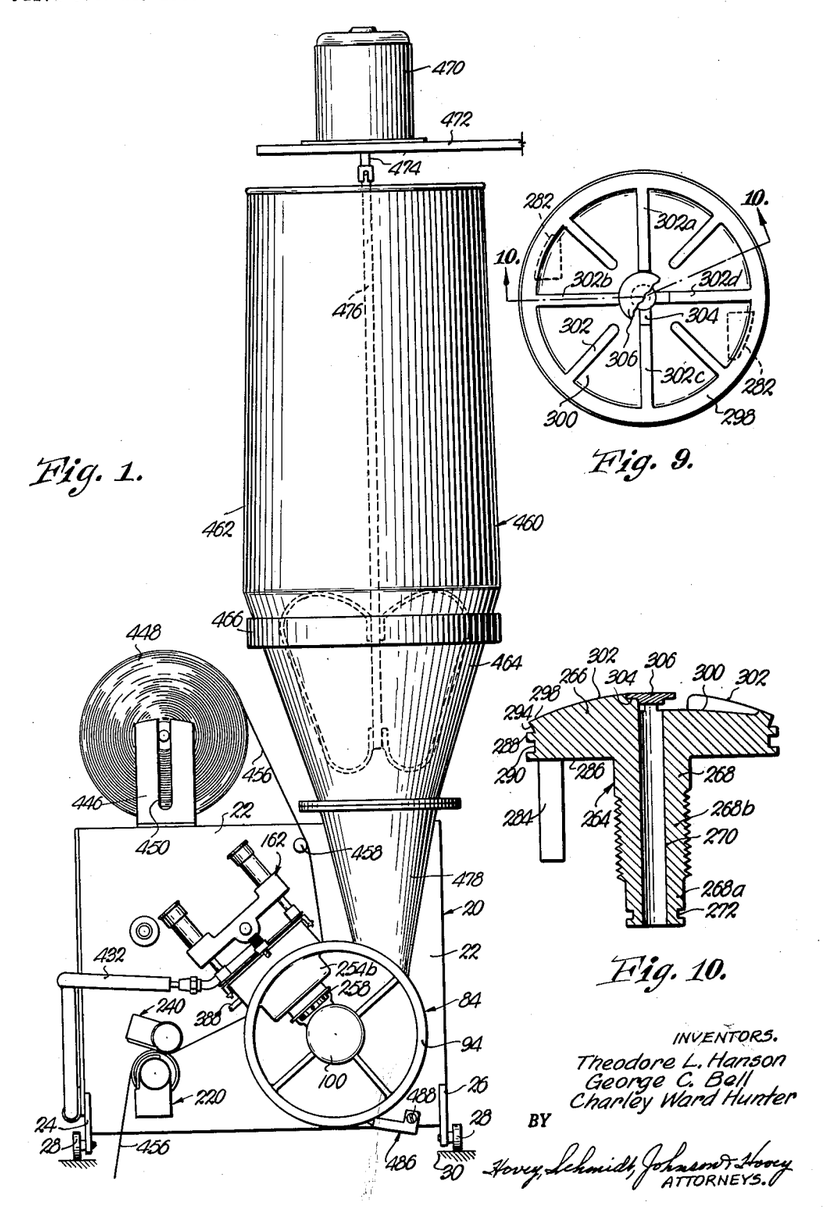

Apparatus 20 includes a main vertical support plate 22 carried by a pair of horizontally disposed, spaced end plates 24 and 26 in perpendicular relationship to main plate 22 and located adjacent the lower margin of the same as illustrated in FIG. 1. Rollers 28 rotatably mounted on corresponding plates 24 and 26 adjacent the outer extremities thereof, extend below the lower edges of plates 24 and 26 and thereby permit apparatus 20 to be roller along supporting surface 30 provided within the cabinet of the vending machine.

Figure 7:
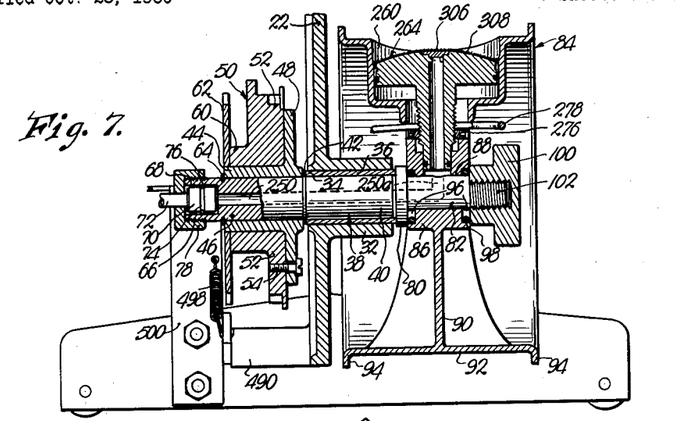
FIG. 7 is a fragmentary, vertical, cross-sectional view substantially on the line 7—7 of FIG. 2.

As shown in FIG. 7, main plate 22 has an integral, outwardly projecting, tubular boss 32 aligned with an opening 34 in main plate 22 and projecting toward the normally forwardmost part of apparatus 20. A tubular bearing sleeve 36 positioned within boss 32 and the opening 34, rotatably carries an elongated, tubular member broadly numerated 38, and including a central section 40 substantially coextensive in length with bearing 36 and complementally engaging the inner surface thereof.

A split washer 42 received in a groove in tubular member 38 adjacent the rearmost end of bearing 36, engages the later and prevents movement of member 38 toward the front of apparatus 20. A cylindrical sleeve 44 mounted on the section 46 of tubular member 38 and provided with an outwardly extending, circular flange section 48 thereon, proximal to the rearmost face of plate 22, mounts a drum gear broadly numerated 50 which is in flush engagement with flange 48 and complementally received on the tubular portion of sleeve 44. Gear 50 has a circular, externally toothed section 52 proximal to and abutting flange 48, while a screw 54, passing through flange 48 and threaded into section 52, secures gear 50 to sleeve 44. If desired, the screw 54 may be adjustably connected to gear 50 so that the latter may be rotated through a predetermined arc with respect to sleeve 44.

Figure 2:
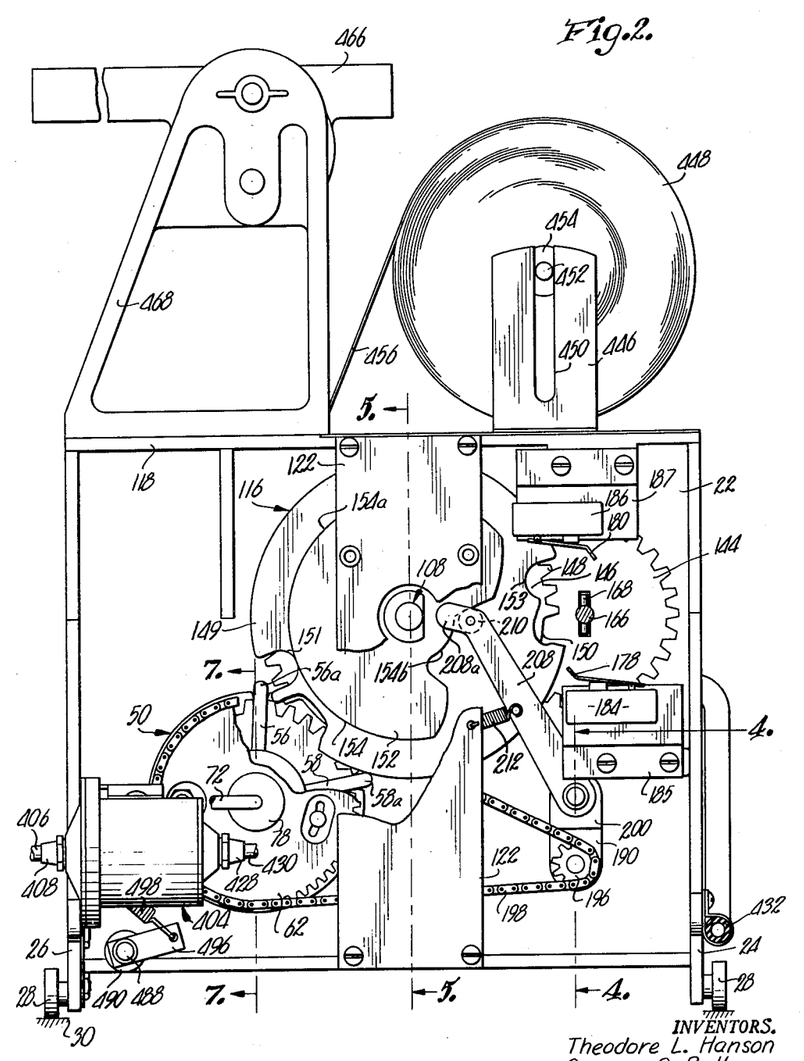
FIG. 2 is a fragmentary, rear elevational view of the apparatus illustrated in FIG. 1, with the ground coffee receiving hopper being removed from the apparatus, and with certain portions of the components thereof being broken away to reveal details of the elements therebehind.

A pair of integral, radially projecting extensions 56 and 58 are provided on the face of gear 50 away from flange 48, and the angle between extensions 56 and 58 is approximately 72°, and as best indicated in FIG. 2, the outer extremities 56a and 58a of extensions 56 and 58, project outwardly beyond the periphery of toothed section 52 of gear 50.

Tubular boss portion 60 of gear 50, projecting outwardly from plate 22, serves as an abutment for sprocket wheel 62 which is positioned on sleeve 44 adjacent the outer end thereof for rotation with gear 50. A split washer 64 is received in a groove in member 38 adjacent the outer face of sprocket wheel 62 for retaining the latter in proper disposition on member 38. The outer end 66 of member 38 has a cylindrical recess 68 therein for receiving water coupling 70 which is of generally cylindrical configuration, is provided with a tubular bore therethrough communicating with water line 72, and has a circumferentially extending groove 74 in the outer surface thereof for receiving an O-ring 76 which prevents water from leaking past cylindrical coupling 70. An internally threaded coupling member 78 is removably threaded over the externally threaded portion 66 of member 38 to thereby retain cylindrical coupling 66 within recess 68, it being noted that line 72 extends through an opening therefor in the circular end wall of coupling member 78.

The portion of member 38 extending rearwardly from plate 22, has a circular segment 80 of greater diameter than central section 40 thereof to present a shoulder normally engaging the outer extremity of sleeve 36, while the outer segment 82 of member 38 remote from section 40, is of less diameter than the latter and serves as means for mounting the generally cylindrical brew drum broadly designated 84.

The central hub 86 of drum 84 has an opening 88 therein complementally receiving segment 82 of member 38 of substantially equal length to the latter and serving as means for mounting the central, generally circular web 90 of drum 84, which in turn carries cylindrical side wall 92 having integral, outwardly turned, annular, concentric flange sections 94. Hub 86 of drum 84 is provided with opposed, co-axial, annular depressions 96 therein for receiving corresponding O-rings 98 providing a fluid-tight seal against segment 80, as well as internally threaded coupling nut 100 removably threaded over the externally threaded segment 102 comprising the outer extremity of that end of member 38 adjacent drum 84.

Figures 5, 6:
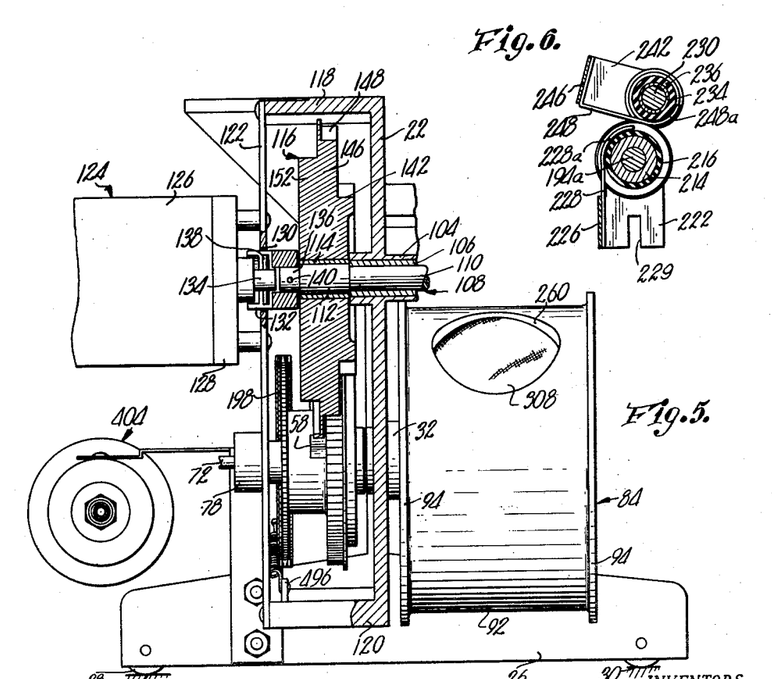
FIG. 6 is a fragmentary, vertical, cross-sectional view taken on line 6—6 of FIG. 4.

With reference to FIG. 5, it is noted that plate 22 also has an integral tubular boss 104 spaced above boss 32 and to one side of the latter for carrying a bearing sleeve 106, which in turn rotatably receives an elongated drive shaft broadly designated 108 and having a segment 110 which complementally engages the inner surface of sleeve 106. Enlarged section 112 of shaft 108 adjacent the outer extremity of boss 104 on the rear face of plate 22, carries a bearing 114 which in turn mounts a power gear broadly numerated 116.

Rearwardly extending, generally horizontal shelf sections 118 and 120 integral with the upper and lower margins respectively of plate 22 and extending rearwardly therefrom, serve as means for mounting an upright strip 122 which carries a prime mover unit 124, including an electric motor 126 and brake mechanism 128 with strip 122 being provided with an opening 130 therein for clearing tubular coupling 132 serving to connect the drive shaft 134 of motor 126 to the reduced segment 136 of shaft 108 and projecting outwardly from the rear face of gear 116. As best shown in FIG. 5, drive shaft 134 is provided with a transversely extending pin 138 therein, engaging coupling 132, while segment 136 of shaft 108 also has a cross pin 140 which is connected to coupling 132 so that upon rotation of shaft 134, shaft 108 is rotated therewith at the same speed.

Gear 116 which is preferably cast as one piece, has an inner, circular, externally toothed section 142 adapted to mesh with cam gear 144 which will be described in greater detail hereinafter. The central section 146 of gear 116 is externally toothed throughout a portion of the outer circular surface thereof and preferably through an arc of approximately 188°. The teeth 148 of section 146 are adapted to intermesh with toothed section 52 of gear 50, while the smooth section 146 clears the outer extremities of the teeth of section 52, as illustrated in FIG. 2. The circular disc portion 149 of gear 116, has a pair of inwardly extending circular notches 151 and 153 (FIGS. 14 and 15) in the outer periphery thereof and disposed to receive the extremities 56a and 58a respectively of extensions 56 and 58. Two imaginary lines through the center of shaft 108 and bisecting the centers of corresponding notches 151 and 153, present an angle therebetween of approximately 172°.

The outer cam section 152 of gear 116, has an irregular cam surface 154 (FIG. 2) which includes a generally circular segment 154a and an irregular recessed segment 154b for purposes to be made clear hereinafter. The extremity 156 of shaft 108 (see FIG. 8), and extending in overlying relationship to the cylindrical side wall 92 of drum 84, carries a transversely triangular cam 158 thereon which is secured to shaft 108 by setscrew 160, for biasing the brew assembly broadly designated 162, toward the periphery of drum 84.

Figure 3:
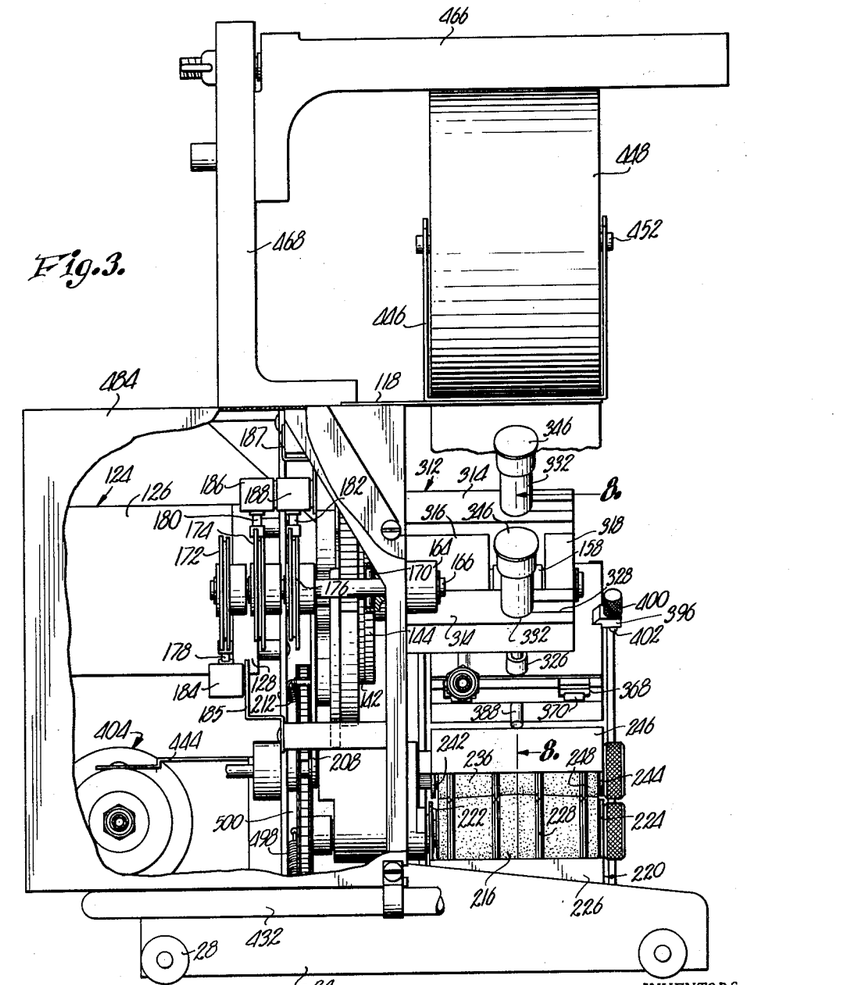
FIG. 3 is a side elevational view of the present brewing apparatus and also having portions thereof broken away to show the components of the same with greater clarity.

Viewing FIG. 3, it can be determined that plate 22 has a third tubular boss 164 integral therewith and communicating with an opening (not shown) in plate 22 for receiving an elongated cam shaft 166, which extends through boss 164, a sleeve bearing positioned therein and projecting rearwardly from plate 22 in parallelism with the shaft 134 of electric motor 126.

The relatively large cam gear 144 mounted on shaft 166 is precluded from rotating relative to shaft 166 by pin 168 through shaft 166 and complementally received in suitable opposed recesses 170 therefor in gear 144. Three cams 172, 174 and 176 are mounted on shaft 166 for rotation therewith, and disposed to engage the switch arms 178, 180 and 182 respectively of switches 184, 186 and 188. Switch 184 is carried by a bracket 185 secured to plate 22, while switches 186 and 188 are mounted on a bracket 187 connected to shelf section 118 on the upper end of plate 22.

Tubular boss 190, integral with plate 22 (FIG. 4), adjacent the lower margin thereof, receives a sleeve bearing 192 which carries a rotatable shaft 194 projecting outwardly from opposed ends of sleeve 192. A sprocket wheel 196 secured to the extremity of shaft 194, projecting rearwardly from plate 22, is in direct alignment with the sprocket wheel 62 rotatable with gear 50, and an endless chain 198 is threaded over sprocket wheels 62 and 196 so that, upon rotation of member 38, shaft 194 is rotated therewith at a substantially higher rate.

Boss 200, positioned immediately above boss 190 and integral with the latter, as well as plate 22, also projects rearwardly from plate 22 and carries a sleeve bearing 202 which in turn rotatably receives a crank broadly designated 204. One cylindrical section 206 of crankshaft 204, is complementally and rotatably received in bearing sleeve 202, and has an outer extremity 206a projecting outwardly from boss 200. A follower arm 208 is secured to extremity 206a of crankshaft 204 for movement with section 206 thereof, and as indicated in FIG. 2, follower arm 208 extends upwardly into direct overlying relationship to the gear 50. The outer end 208a of follower arm 208, is at an acute angle with respect to the major length of arm 208, and rotatably carries a follower 210 disposed to engage and ride along the cam surface 154 of cam section 152. A coil spring 212 connected to arm 208 intermediate the ends thereof, and to strip 122, biases follower arm 208 in a direction to maintain follower 210 in engagement with surface 154 of cam section 152.

Figure 4:
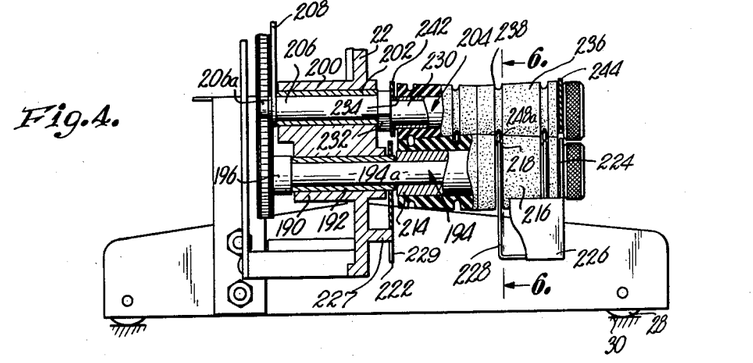
FIGS. 4 and 5 are fragmentary, vertical, cross-sectional views taken substantially on the lines 4—4 and 5—5 respectively of FIG. 2.

The end 192 of shaft 194, projecting forwardly from the front face of plate 22, has a sleeve 214 thereon, in turn carrying a rubber roller 216 which is of greatest diameter at the central section thereof as indicated in FIG. 4, and provided with a series of longitudinally spaced, circumferentially extending grooves 218 therein.

A generally U-shaped paper filter stripper 220 is carried by the bearing 192 on shaft 194 and includes a pair of end segments 222 and 224 depending from the bearing 192 and sleeve 214 on opposed ends of roller 216. The segments 222 and 224 are interconnected by a rectangular bight 226 spaced from the outer surface of roller 216 and stripper 220 is prevented from rotating about shaft 194 by stop 227 which extends into notch 229 (FIG. 6) in end segment 222. Bight 226 mounts a series of generally J-shaped stripper wires 228 for each of the grooves 218, and thereby provided with outer curved segments 228a substantially complementally received within respective grooves 218 in roller 216 (FIG. 6).

The section 230 of crank 204, and which is located out of axial alignment with section 206 by virtue of the intermediate connector section 232 of crankshaft 204, mounts a tubular sleeve 234, which in turn carries a rubber roller 236 provided with an outer surface which is of narrowest transverse diameter at the central section thereof so that the outer surface of roller 236 is substantially complemental with the outer surface of roller 216. As indicated in FIG. 4, roller 236 has longitudinally spaced, circumferentially extending grooves 238 therein aligned with corresponding grooves 218 in roller 216.

A filter paper stripper 240 is also mounted on section 230 of crankshaft 204, and includes a pair of legs 242 and 244 positioned at opposite ends of roller 236, and rotatably mounted on section 230. Rectangular bight 246 spaced from roller 236 and interconnecting legs 242 and 244, mounts additional generally J-shaped stripper wires 248, having outer arcuate segments 248a complementally received within corresponding grooves 238 in roller 236 immediately above roller 216, as shown in FIG. 6. It is to be understood that during clockwise rotation of follower arm 208, as follower 210 rides along section 154b of cam surface 154 and up onto the section 154a thereof, crankshaft 204 is rotated through a sufficient arc to shift roller 236 into contacting relationship to roller 216.

The member 38 is provided with a central passage 250 therethrough, having a generally L-shaped section 250a in the segment 82 thereof which communicates with a chamber 252 (FIG. 8) defined by irregularly shaped side walls 254 forming a part of web 90 of drum 84. The central hub portion 86 of drum 84 has a radially extending passage 256 therein in direct alignment with the outlet opening of passage 250a and defining a part of chamber 252.

The outwardly extending cylindrical wall sections 254a of walls 254, have a pair of opposed, substantially rectangular openings 258 therein which communicate the interior of chamber 252 with the surrounding atmosphere. The upper, generally cylindrical wall sections 254b of walls 254, have a generally circular recess 260 therein, extending through the outer surface of side wall 92 of cylindrical drum 84, with the passage 262 presented by side walls 254a being coaxial with recess 260 as well as with passage 256.

A strainer element, broadly designated 264, is removably disposed in the chamber 252 presented by recesses 260 and 262, as well as passage 256, and element 264 includes an upper dome-shaped section 266 (FIG. 10) having an integral, centrally disposed stem 268 provided with a passage 270 therethrough which also extends through section 266.

Figure 8:
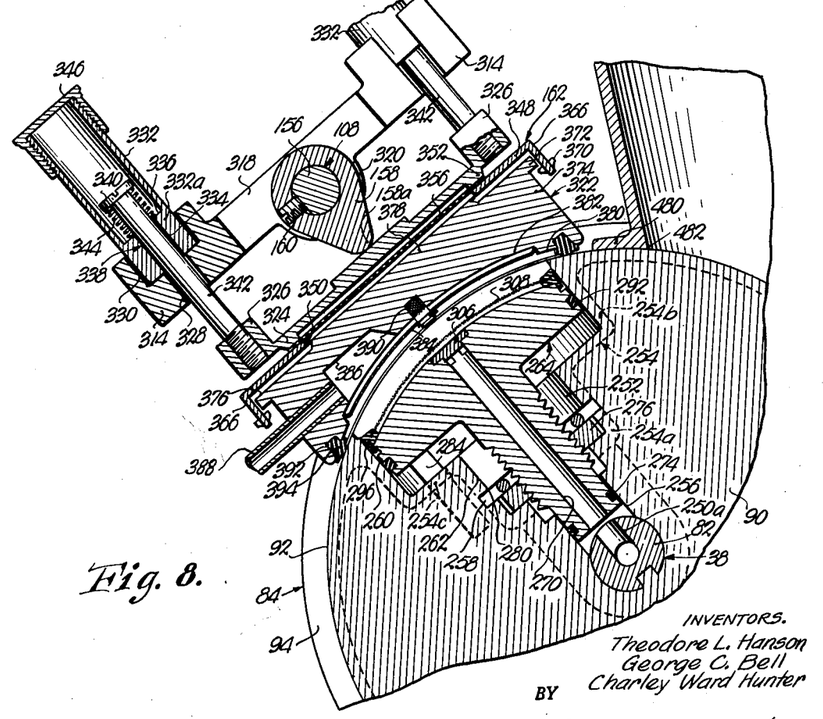
FIG. 8 is an enlarged, fragmentary, vertical, cross-sectional view on the line 8—8 of FIG. 3.

The lower cylindrical section 268a of stem 268, of reduced diameter and adapted to be disposed in passage 256 in substantial complemental engagement therewith, has a circumferentially extending groove 272 in the lower extremity thereof, adapted to receive an O-ring 274 for preventing leakage of water around the outer surface of section 268a, it being noted from FIG. 8 that the central passage 270 in stem 268 and section 266, is in direct alignment with the outlet of passage 250 when element 264 is mounted in chamber 252. The intermediate section 268b of element 264 is externally threaded and disposed to be received in passage 262 defined by side walls 254a and in direct alignment with the opposed openings 258 in side wall sections 254. A nut 276 is threaded onto intermediate section 268b of stem 268 and portions thereof project outwardly through openings 258 thereby permitting adjustment of the disposition of element 264 within chamber 252 in response to rotation of nut 276. It can be seen that while nut 276 is restricted against movement in a direction along the axis of chamber 252, rotation of nut 276 causes the element 264 to be shifted toward and away from the axis of segment 82.

A generally U-shaped retainer clip 278 limits rotation of nut 276 and has opposed legs extending through openings 258 and engaging the upper face of nut 276, as well as the lower margins 280 of wall sections 254 defining the upper part of corresponding openings 258. The bottom wall segment 254c of wall sections 254b is provided with a pair of opposed, generally triangular openings 282 (FIG. 9) therein for clearing corresponding extensions 284 integral with the circular underface 286 of section 266 of element 264 and depending therefrom as indicated in FIG. 10.

The circular margin 288 of dome section 266 of element 264, is provided with a lower circumferentially extending groove 290 adapted to receive an O-ring 292, while an upper, generally triangular groove 294 in margin 288 and coaxial with groove 290, receives a transversely, irregular, main sealing gasket 296 which is also adapted to engage the circular side wall of recess 260, as is the case with O-ring 292 when element 264 is mounted in chamber 252.

The upper face 298 of dome section 266 of element 264, is provided with a plurality of depressed areas 300 defined by upwardly projecting extensions 302 integral with dome-shaped section 266 and disposed radially with respect to the axis of passage 270. Four extensions 302a, 302b, 302c and 302d, project inwardly to central passage 270 and have upwardly facing notches 304 therein for clearing a transversely T-shaped, circular dispersing cap 306 which has a central, cylindrical, depending section disposed in passage 270 through dome-shaped section 266 while the circular flange portion of such cap 306 is located in notches 304. A circular screen 308 overlies dome-shaped section 266 of element 264 and is disposed with the peripheral margin thereof under a portion of gasket 296 so that screen 308 is maintained in proper disposition throughout the brewing process.

The brewing assembly which cooperates with drum 84 to provide single cups of freshly brewed coffee, and which is broadly designated by the numeral 162 and includes a main frame 312 integral with the forward face of plate 22 and extending forwardly therefrom as indicated in FIG. 3. Frame 312 includes a pair of arm sections 314 disposed in parallel relationship, interconnected by a central web portion 316, as well as by an outer web 318 spaced from web 316 and perpendicular to leg portions 314. Web 318 has an integral, depending, generally semi-cylindrical section 320 intermediate legs 314, and rotatably receiving the outer extremity 156 of power shaft 108. The triangular cam 158, mounted on extremity 156 of shaft 108, is located between webs 316 and 318 as shown in FIG. 3.

A clamping block unit broadly deisgnated 322 (FIG. 8), is shiftably carried by frame 312 and includes a relatively flat, rectangular upper plate 324 having a pair of integral, tubular, upwardly extending, internally threaded bosses 326, located adjacent opposed margins of plate 324 intermediate the opposite side edges thereof. Arms 314 of frame 312, have inwardly extending recesses or notches 328 in opposed extremities thereof with generally cylindrical recesses 330 being provided in the upper faces of opposed arms 314 at the inner terminal ends of corresponding notches 328.

Recesses 330 in arms 314, each receive an elongated, tubular member 332 open at the upper extremity thereof, and having a bottom section 332a provided with a central passage 334 therethrough of somewhat smaller diameter than the inside diameter of the main portion of each of the members 332 to thereby present an internal shoulder 336 in each member 332. An elongated bolt 338 having an enlarged head 340 thereon, is provided within each of the members 332 and disposed with the main shank 342 thereof projecting downwardly through corresponding notches 328, as well as passages 334 in respective members 332.

The lower ends of shanks 342 are threaded into corresponding bosses 326 on plate 324, whereby the latter are carried by frame 312. Coil springs 344 are interposed between each of the heads 340 of bolts 338 and opposed shoulders 336 of members 332, to bias plate 324 toward webs 316 and 318 of frame 312. Caps 346 are removably mounted on the outer ends of members 332.

Figures 11, 12, 13:
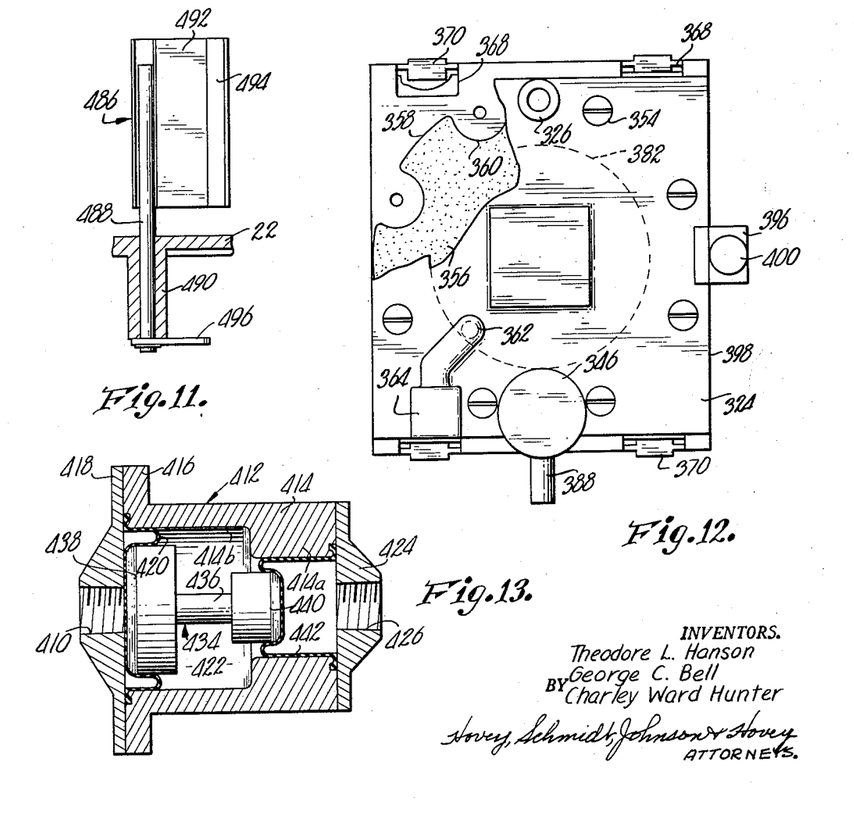
FIG. 11 is an enlarged, fragmentary, plan view of the scraper assembly disposed adjacent the rotatable brew drum for removing coffee grounds from the periphery thereof.
FIG. 12 is a plan view of the brew assembly shiftable toward and away from the rotatable brew drum and disposed at the brewing station, certain portions of the brewing assembly being broken away to show the components thereunder.
FIG. 13 is a vertical, cross-sectional view through the power transformer forming a part of the hydraulically actuated mechanism for shifting the brew assembly into liquid-tight engagement with the outer periphery of the rotatable brew drum.

A second, generally rectangular plate 348 is located in underlying relationship to plate 324 and has a central, generally circular opening 350 therein which is of substantially equal diameter to an annular lip 352 integral with the underside of plate 324. A series of screws 354 (FIG. 12) passing through plate 324 and threaded into plate 348, interconnect the latter with a generally circular rubber diaphragm 356 being placed between the margin of plate 348 defining the opening 350 therein, and the annular lip 352 on the underface of plate 324. As indicated in FIG. 12, the outer peripheral edge 358 of diaphragm 356, has a series of inwardly extending, circular notches 360 therein for clearing corresponding screws 354 threaded into plate 348. A tubular conduit 362 is secured to the upper face of plate 324 in communication with the area thereof defiend by lip 352, and a coupling 364 on the outer extremity of conduit 362, facilitates coupling of the latter to a source of hydraulic pressure as will be explained hereinafter.

Plate 348 has a pair of opposed, depending, integral, rectangular flanges 366 on the margins of plate 348 in perpendicular relationship to plate 22, and each of the flanges 366 has a pair of spaced notches 368 therein extending from corresponding edges of plate 348 downwardly in flanges 366 to transverse support elements 370 integral with flanges 366 and extending outwardly therefrom as best shown in FIGS. 8 and 12. Note in FIG. 12, that elements 370 are of generally rectangular configuration and extend inwardly toward each other a sufficient distance to slidably receive the outwardly projecting margins 372 of clamp block 374 underlying plate 348.

The upper face 376 of block 374 is provided with a central, circular, upwardly projecting portion 378 concentric with opening 350 and of substantially equal diameter with respect thereto. The lower face 380 of block 374 is of generally semi-cylindrical configuration and formed to complementally engage the cylindrical side wall 92 of drum 84.

Face 380 has a generally circular recess 382 therein of a diameter substantially equal to recess 260 in drum 84 and a perforated disc 384 is mounted within recess 382 in overlying relationship to a coffee outlet passage 386 provided in block 374 and communicating with a coffee outlet tube 388. Retainer 390 passing through the central portion of perforated disc 384, and frictionally telescoped into block 374, serves to prevent accidental displacement of disc 384 from block 374. The face 380 of block 374 is also provided with an annular groove 392 in surrounding relationship to disc 384 and adapted to receive a transversely irregular gasket 394 which engages the outer surface of side wall 92 of drum 84 in coaxial relationship with recess 260 in drum 84. A bracket 396 (FIG. 3), secured to and extending outwardly from the margin 398 of plate 324, carries a screw 400 having a lower end portion 402 overlying the proximal margin of block 374 to preclude displacement of block 374 from plate 348 until after removal of screw 400.

Hydraulic mechanism is provided in apparatus 20 for supplying hydraulic fluid to brew assembly 162 for forcing block unit 322 into firm, liquid-tight engagement with the outer peripheral surface of side wall 92 of drum 84. Such hydraulic mechanism includes a power transformer unit broadly designated 404 and provided with a water inlet line 406 adapted to be coupled directly to the hot water supply line 72. A fitting 408 having line 406 secured thereto is threaded into the internally threaded opening 410 of fluid power transformer housing 412. The cylindrical side wall 414 of housing 412 has an outwardly projecting, annular flange 416 at one end thereof and adapted to complementally receive a flange cover 418 secured to flange 416 and having opening 410 therein. A generally circular, flexible diaphragm 420 is interposed between flange 416 and cover 418 for preventing water passing through opening 410 from entering the chamber 422 defined by the cylindrical side wall 414, cover 418, and closure 424 secured to the end of side wall 414 opposed to flange 416. Closure 424 also has a centrally disposed, internally threaded opening 426 therein adapted to receive a fitting 428 which in turn couples hydraulic fluid line 430 to closure 424. A suitable conduit 432 extends from line 430 to coupling 364 along the circuitous path indicated in FIGS. 1 and 2. The interior section 414a of side wall 414 and disposed adjacent closure 424 has a substantially smaller diameter than the wall section 414b of side wall 414 whereby chamber 422 has a relatively large section to the left, viewing FIG. 13, and a substantially smaller section to the right. Pressure transforming member 434 reciprocably disposed within chamber 422 has a central stem 436 connected to a relatively large cylindrical element 438 located within the section of chamber 422 defined by inner wall section 414b, and a substantially smaller cylindrical element 440 normally located adjacent the cylindrical inner portion of chamber 422 presented by section 414a of wall 414. A second flexible diaphragm 442 is interposed between the abutting faces of closure 424 and wall 414 and engages the proximal face of element 440. As previously indicated, the hydraulic mechanism is designed to force block unit 322 into tight engagement with drum 84, and therefore it is to be preferred that the space between diaphragm 356 and the inner face of plate 324, as well as conduit 432 and the interior of pressure transformer unit 404 between fitting 428 and flexible diaphragm 442, be filled with hydraulic fluid, while water enters opening 410 through fitting 408 and impinges directly against flexible diaphragm 420 in engagement with the circular outer face of element 438 carried by stem 436. In the preferred interrelationship between elements 438 and 440, a water pressure of 15 p.s.i. against the outer face of piston element 438 will produce a pressure of 30 p.s.i. on the hydraulic fluid pressing downwardly on the flexible diaphragm 356 and thereby forcing the block unit 322 into tight engagement with the outer periphery of side wall 92 of drum 84. A bracket 444 (FIG. 3) serves to secure housing 412 of power transformer unit 404 to the main frame of apparatus 20 defined in part by support plate 22.

A pair of upstanding straps 446 of generally L-shaped configuration or, in the alternative, a U-shaped member, is carried by the upper horizontal shelf section 118 integral with plate 22 and serve as means for mounting a roll 448 of filter paper. As indicated in FIG. 2, the upwardly extending legs 446 of the rolled paper bracket are provided with downwardly extending, horizontally aligned, vertical slots 450 for slidably receiving an elongated pin 452 passing through the central roller 454 carrying the roll of filter paper 448. The free end of the paper 456 passes downwardly from roll 448 over an idler 458 mounted on the front face of plate 22, thence under face 380 of block unit 322, next between rollers 236 and 216, and finally to a disposition below apparatus 20 such as in a conventional waste tank or the like provided in the coffee vending machine cabinet.

Means broadly designated 460 is provided for delivering predetermined amounts of ground coffee to the brew chamber 252 in drum 84 and such coffee dispensing means includes a relatively large, generally cylindrical hopper 462 having a frusto-conical lower portion 464 provided with a circular bracket 466 therearound which is in turn secured to an upwardly extending bracket unit 468 carried by horizontal shelf section 118 on the upper extremity of main support plate 22. An electric motor 470 is mounted in overlying relationship to the upper extremity of hopper 462 as shown in FIG. 1, carried by suitable bracket means 472 forming a part of the cabinet of the vending machine, and disposed with the output shaft 474 thereof facing downwardly in substantially axial alignment with the axis of hopper 462. An elongated agitator 476 within hopper 462 is operably coupled to shaft 474 for rotation thereby.

A hollow dispenser device 478 is secured to the lower extremity of frusto-conical portion 464 of hopper 462 and is provided with a lower end 480 which is of transversely arcuate configuration to complementally engage the outer face of side wall 92 of drum 84. It is to be pointed out that the opening 482 in the lower extremity of device 478 is preferably of slightly greater diameter than recess 260 so that filling of such recess above element 264 is obtained as the chamber 252 is rotated past dispenser device 478 during normal movement of drum 84.

It is desirable that a cover pan 484 be placed over the end of apparatus 20 as illustrated in FIG. 3, to prevent service personnel from inadvertently reaching into the portion of the mechanism having the relatively large intermeshing gears therein, and also to discourage manipulation of the switches 184, 186 and 188 by hand.

In order to assure that coffee grounds are removed from the outer face of side wall 92 of drum 84, a stripper unit broadly designated 486 is rotatably mounted on the front face of plate 22 and proximal to the normally lower portion of drum 84 as indicated in FIG. 1. Unit 486 includes a horizontal shaft 488 rotatably received in a tubular boss 490 integral with plate 22 and extending rearwardly therefrom as illustrated in FIG. 11. A rectangular paddle 492 secured to the outer end of shaft 488 projecting outwardly from the front face of plate 22, is located between flanges 94 of drum 84 and has a flexible member 494 thereon positioned to engage the surface of side wall 92 of drum 84 in wiping relationship thereto. A crank arm 496 on the extremity of shaft 488 projecting rearwardly from boss 490, is biased in a counterclockwise direction viewing FIG. 2, by a coil spring 498 connected to upright 500 forming a part of the framework of apparatus 20.

Figure 16:
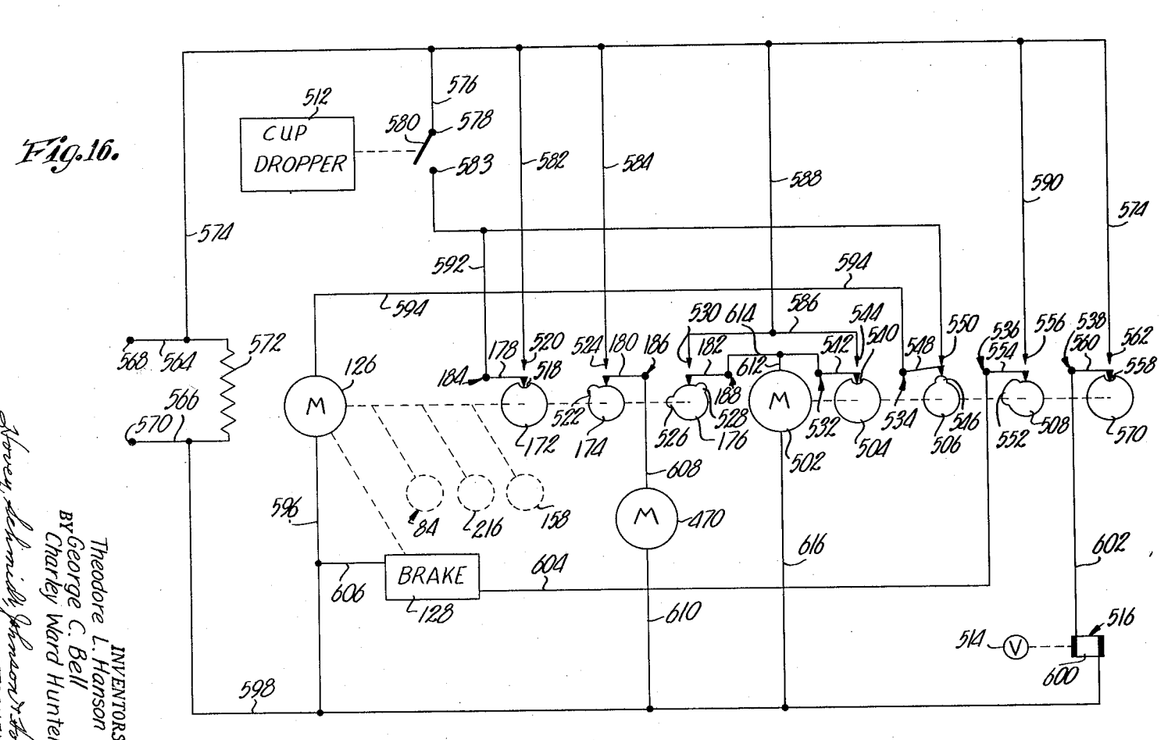
FIG. 16 is a schematic showing of electrically operable components and the circuitry therefor, showing one type of control mechanism for the movable elements of the present brewing apparatus.

The electrical components and the circuitry therefor illustrated in FIG. 16 of the drawings is intended to be illustrative of structure for operating the beverage brewing apparatus 20 through one cycle thereof. It is to be understood however, that electrical components other than those illustrated and described may be employed if the same perform equivalent functions.

In the schematic representation in FIG. 16, the main drive motor 126 is shown as being operably coupled to the cams 172, 174 and 176 respectively for rotating the same in response to energization of motor 126. In addition, a timing motor 502 is provided and which is operably connected to a series of cams 504, 506, 508 and 510 for rotating the latter in response to actuation of motor 502. The agitator motor 470 is indicated in its operative relationship while the brake 128 forming a part of unit 124 is also indicated schematically. Since the cup dropping mechanism of the present coffee vending machine forms no part of the instant invention, the cup dropping unit is indicated schematically by the numeral 512 while the valve 514 interposed in the hot water line for controlling flow of water therethrough, is shown as being operably connected to a solenoid 516 for controlling actuation of the valve. The switches 184, 186 and 188 associated with cams 172, 174 and 176 respectively, are illustrated in their normal operative relationship, with the switch arms 178, 180 and 182 thereof being disposed to engage the outer peripheral edges of cams 172, 174 and 176. It is to be noted that the outer surface of cam 172 has a depression 518 therein for receiving the outer extremity of switch arm 178 of switch 184 to permit arm 178 to move out of engagement with contact 520 of switch 184 when arm 178 is in depression 518. Similarly, the cam 174 has an outwardly extending projection 522 adapted to engage switch arm 180 and shift the latter into engagement with the contact 524 of switch 186. The cam 176 has a pair of circumferentially spaced, outwardly extending projections 526 and 528 respectively which are disposed to alternately shift switch arm 182 into engagement with contact 530 of switch 188.

Cams 504, 506, 508 and 510 have switches 532, 534, 536 and 538 respectively associated therewith. Cam 504 has a depression 540 therein adapted to receive the switch arm 542 of switch 532 to permit such switch arm to move out of engagement with the contact 544 of switch 532. Cam 506 is provided with an outwardly extending projection 546 disposed to engage the switch arm 548 of switch 534 and thereby move the switch arm into engagement with contact 550 of switch 534. Cam 508 has a relatively long, outwardly projecting cam projection 552 which is adapted to engage the switch arm 554 and shift the same into engagement with contact 556 of switch 536. The final cam 510 has a depression 558 in the outer periphery thereof for receiving switch arm 560 to permit the latter to shift away from the contact 562 of switch 538.

The schematic diagram of FIG. 16 also indicates that the brew drum 84, the filter paper transport mechanism including roll 216 and the cam 158 are all driven by motor 126 during operation thereof.

The main power leads 564 and 566 are connected to power terminals 568 and 570 respectively with an electrical resistance water heating element 572 being coupled directly to power leads 564 and 566. A line 574 couples power lead 564 intermediate terminal 568 and heating element 572, to contact 562 of switch 538. Line 576 joining contacts 550 of switch 534 to line 574 has a switch 578 interposed therein including a switch arm 580 shiftable into and out of engagement with a contact 583 in line 576, it being pointed out that switch arm 580 is operated by the cup dropping mechanism of thte coffee vending machine in a manner to be described in greater detail hereinafter. The line 582 joins line 574 to contact 520 of switch 184 while a similar line 584 couples the contact 524 of switch 186 to line 574. Line 586 interconnects the contacts 530 and 544 of switches 188 and 532 respectively, while a line 588 couples line 586 to line 574. The contacts 556 of switch 536 is coupled to line 574 by a line 590.

Switch arm 178 of switch 184 is joined to line 576 intermediate switch 578 and contact 550 of switch 534, by a line 592. One terminal of motor 126 is connected to the switch arm 548 of switch 534 by a line 594 while the opposite terminal of motor 126 is connected directly to power lead 566 through a line 596 which is in turn connected to line 598 joining power lead 566 with one terminal of the coil 600 of solenoid 516. The opposite terminal of solenoid 516 is connected to the switch arm 560 of switch 538 by a line 602. The brake unit 128 is connected to switch arm 554 of switch 536 by a line 604, and to line 596 by line 606. The field windings of agitator motor 470 are coupled to switch arm 180 of switch 186 by a line 608, and to line 598 by line 610. Power is furnished to timer motor 502 by a line 612 joined to one terminal of motor 502 and to a line 614 interconnecting the switch arm 182 of switch 188 with the switch arm 542 of switch 532, while the opposite terminal of motor 502 is connected to line 598 by line 616.

*Operation*

The hopper 462 is filled with a quantity of ground coffee which is preferably ground to an extremely fine particle size so as to obtain most efficient removal of valuable constituents therefrom upon passage of hot water through the brewing apparatus 20, as detailed hereinafter. As previously set forth, apparatus 20 is adapted to be positioned in a conventional coffee vending machine cabinet and, therefore, it is assumed that the coffee outlet line 388 extends to the station where a coffee cup is deposited by the cup dropping mechanism so that the brewed beverage is delivered directly to such cup whereupon the customer may remove the same from the cabinet.

After the customer has deposited coinage of predetermined value in the machine, he pushes any one of a number of selector buttons in order to obtain the coffee. For example, the selector buttons may include black coffee, coffee with cream, coffee with sugar, or coffee with cream and sugar. Closing of the selector switch actuates cup dropping mechanism 512 which includes a cam disposed to engage switch arm 580 of switch 578 to thereby shift arm 580 into contacting relationship with a contact 583. Closing of switch 578 results in energization of motor 126 through a circuit including power terminal 568, power lead 564, line 574, line 576, including close switch 578, contact 550 of switch 534, switch arm 548, which is maintained in engagement with contact 550 by the projection 546 on cam 506, line 594, the field windings of motor 126, line 596, line 598, power lead 566 and terminal 570.

Figure 14:
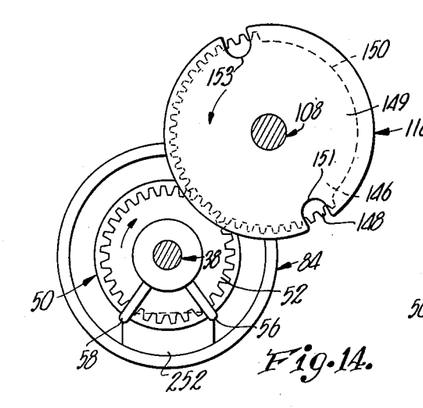
FIG. 14 is a schematic representation of the main brew drum gear and power driven gear, and illustrating the normal disposition of the same when the rotatable brew drum is in the stand-by position thereof.

At the instant of energization of motor 126, the drum gear 50 and power gear 116 are in the disposition thereof as illustrated in FIG. 14 and with drum 84 in stand-by condition.

Thus, it can be seen that an imaginary line through the axis of member 38 and bisecting projections 56 and 58 is substantially vertical, while imaginary lines through the axes of member 38 and shaft 108 and through the axis of shaft 108 and bisecting notch 153, present an angle therebetween of approximately 120°. It can, therefore, be seen that the ground coffee receiving chamber 252 in drum 84 is facing directly downwardly and that the 172° angle between notches 151 and 153 is to the right and facing upwardly.

Upon energization of motor 126, power gear 116 operably mounted on shaft 108 is rotated with the shaft 134 of motor 126 to thereby rotate gear 116 in a counterclockwise direction viewing FIG. 14. Inasmuch as the teeth 148 of gear 146 are in intermeshing relationship with the teeth of gear 52, when gears 116 and 50 are disposed in the stand-by positions thereof, rotation of gear 116 causes gear 50 to be rotated in a clockwise direction, as shown in FIG. 14. During counterclockwise rotation of drum 84 when viewing apparatus 20 from the front thereof, it is to be seen that the recess 260 in drum 84 is caused to pass beneath the lower extremity of coffee dispensing device 478, whereupon the area of chamber 252 defined by a portion of recess 260 and the upper part of element 264 is filled with ground coffee and with the lower edge of device 478 serving to meter the amount of ground coffee in chamber 252 by virtue of the fact that the lower margin of device 478 levels off the coffee in recess 260 into substantially conforming relationship to the cylindrical surface of side wall 92 of drum 84.

During operation of motor 126 to effect rotation of drum 84, the cam 172 is rotated therewith to cause switch arm 178 of switch 184 to be shifted into engagement with contact 520 thereby setting up a holding circuit for motor 126 and permitting the cam of the cup dropping mechanism 512 to allow switch 578 to open. The holding circuit for motor 126 includes line 574, line 582, contact 520, switch arm 178 of switch 184, line 592, line 576, contact 550, switch arm 548 of switch 534, line 594, motor 126, line 596, line 598 and power lead 566.

Substantially immediately upon energization of motor 126, the agitator motor 470 is energized for a short period in order to assure delivery of ground coffee through dispensing device 478 and without bridging of the coffee across opening 482. Agitator motor 470 is energized through a circuit including power lead 564, line 574, line 584, contact 524, switch arm 180 of switch 186 which has been shifted into engagement with contact 524 by projection 522 of cam 174 which is rotated by motor 126, line 608, the field windings of motor 470, line 610, line 598 and power lead 566.

Figure 15:
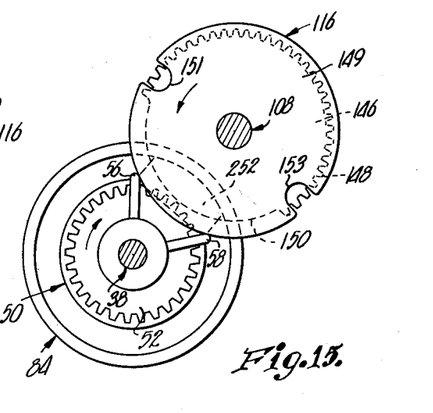
FIG. 15 is a schematic representation similar to FIG. 14 and illustrating the disposition of the gears when the brew drum is in the brewing position thereof.

During relative rotation of gears 116 and 50 to bring drum 84 into the brew position thereof, as illustrated in FIG. 8, the outer extremity of extension 58 on gear 50 is received in notch 153 in disc portion 149 of gear 116, whereupon the outer extremities of projections 56 and 58 engage the smooth segment 150 of central section 146 of gear 116 thereby locking drum 84 against further rotation. It is to be pointed out that when extensions 56 and 58 engage smooth segment 150 of gear 116, the brewing chamber 252 is disposed in direct opposition to block unit 322 of brew assembly 162, as indicated in FIGS. 8 and 15. Gear 116 continues to rotate through a predetermined arc constituting half of the angle between notches 151 and 153 and in the illustrated embodiment is approximately 86°. During such continued operation of motor 126 to rotate gear 116, the shaft 108 is also rotated to thereby turn cam 158 into a position, as illustrated in FIG. 8, wherein the extremity 158a thereof engages the cam surface on plate 324 thereby biasing plate 324, plate 348 and block unit 322 toward the outer surface of side wall 92 of drum 84 and with gasket 394 firmly engaging side wall 92 in surrounding relationship to recess 260 in drum 84. The cam 158 biases the brew assembly 162 into engagement with drum 84 between flanges 94 thereof, against the action of coil springs 344 surrounding bolts 338. It is to be remembered that the recess 260 immediately above screen 308 on element 264 is filled with ground coffee received from hopper 462 and, therefore, the coffee is disposed in a brewing chamber defined in part by chamber 252 and the lower circular portion of brew block 322.

As soon as cam 158 has been rotated into the position thereof illustrated in FIG. 8 by shaft 108, motor 126 is deenergized and brake 128 is applied. Deactivation of motor 126 is accomplished by projection 526 of cam 176 being rotated into a position shifting arm 182 of switch 188 into engagement with contact 530 whereby timer motor 502 is energized through a circuit including power lead 564, line 574, line 588, line 586, contact 530, switch arm 182 of switch 188, line 614, line 612, motor 502, line 616, line 598, and power lead 566. As soon as motor 502 is energized, the cam 504 operably coupled thereto, is rotated to shift the switch arm 542 of switch 532 out of depression 540 and into engagement with contact 544 to thereby set up a holding circuit for motor 502. Such holding circuit includes line 588, line 586, contact 544, switch arm 542 of switch 532, line 614, line 612, the motor 502, and line 616 which is coupled to line 598 and thence power lead 566. The projection 526 moves out of engagement with switch arm 182 of switch 188 to permit the latter to open prior to deenergization of motor 126.

Substantially simultaneously with closing of motor holding switch 532, the normally closed switch 534 is permitted to open by virtue of projection 546 of cam 506 moving out of engagement with switch arm 548 whereby the latter shifts away from contact 550 and thereby breaking the circuit to motor 126 via line 594 connected to switch arm 548.

Cotemporaneously with opening of switch 534, the projection 552 of cam 508 shifts switch arm 554 of switch 536 into engagement with contact 556 whereupon a circuit to brake 128 is completed through power lead 564, line 574, line 590, contact 556, switch arm 554 of switch 536, line 604, electrical brake 128, line 606, line 596, line 598 and power lead 566. Braking of motor 126 arrests movement of shaft 108 thereby stopping gear 116 at a point exactly centered between notches 151 and 153, as clearly indicated in FIG. 15.

The heater element 572 operably coupled to power leads 564 and 566 and controlled thermostatically, heats the water delivered to brewing apparatus 20 so that the final coffee product will be of a predetermined temperature. Thus, rotation of cam 510 by motor 502 upon energization of the latter, causes the switch arm 560 of switch 538 to move out of the depression 558 in cam 510 whereby switch arm 560 is moved into engagement with contact 562 and completing a circuit to solenoid 516. Energization of the coil 600 of solenoid 516 is effected through power lead 564, line 574, contact 562, switch arm 560 of switch 538, line 602, coil 600, line 598 and power lead 566. Valve 514 in water line 72 is opened upon activation of solenoid 516 thereby permitting hot water to flow through line 72 and thence into the passage 250 extending through member 38.

Prior to the detailed description of brewing of the coffee, it should be pointed out that upon opening of valve 514 to permit water to flow through line 72, such water pressure is also applied to the piston defined by elements 438 and 440 interconnected by stem 436 and effecting a multiplication of the water line pressure in the hydraulic line 432 to cause flexible diaphragm 356 to be forced downwardly against the upper face of projection 379 on block unit 322 to thereby force gasket 394 into tighter engagement with drum 84. It can be seen that block 322 is shiftable relative to plate 348 under expansion of diaphragm 356 and block 372 will be shifted toward side wall 92 of drum 84 under a higher pressure than the pressure of the water entering chamber 252.

The hot water flowing through passage 250 in member 38 passes through section 250a in segment 82 of member 38 and thence upwardly into the passage 256 in drum 84 and ultimately into the passage 270 through the stem 268 of element 264. The water then flows outwardly from the upper extremity of passage 270 beneath cap 306 and radially therefrom along the surfaces of areas 300 in dome-shaped section 266 of element 264. The hot water is thereby distributed over the entire area of the upper portion of section 266 and is forced upwardly through screen 308 into the ground coffee positioned in the brewing chamber as set forth above. The water containing soluble components extracted from the ground coffee then passes through the portion of filter paper 456 located between block 374 and side wall 92 of drum 84 whereby the coffee delivered to passage 386 in block 374 is free of all solid materials. The coffee then passes through tube 388 and ultimately via a coffee line to the cup stationed at the point of delivery of the beverage to the customer. The length of time during which water is permitted to flow through brewing assembly 162 is determined by cam 510 with flow of water continuing until switch arm 560 again moves into depression 558 and thereby out of engagement with contact 562.

Return of cam 510 to the disposition thereof as illustrated in FIG. 16, also means that cam 504 is returned to a location permitting switch arm 542 to move into recess 540 and thereby out of engagement with contact 544 whereby the circuit to timing motor 502 is interrupted and discontinues operation of timing motor 502. The motor switch 534 is closed by virtue of arm 548 being shifted into engagement with contact 550 under the action of projection 546 on cam 506, but the circuit to motor 126 is not completed therethrough from line 577 because switch 578 is in an open condition.

As soon as cam 506 has been rotated through its entire arc as defined above to thereby cause the switch arm 548 of switch 534 to be shifted into engagement with contact 550, motor 126 is reenergized through a circuit including power lead 564, line 574, line 582, contact 520, switch arm 178 of switch 184 which remains in engagement with contact 520 by virtue of the fact that cam 172 has been rotated through only approximately one-half of its path of rotation, line 592, line 576, contact 550, line 548 of switch 534, line 594, the field windings of motor 126, line 596, line 598 and power lead 566.

During initial operation of motor 126, the shaft 108 is rotated to shift extension 158a of cam 158 out of engagement with plate 324 whereby block unit 322 is permitted to shift away from drum 84 under the influence of springs 344. It is to be noted that the hydraulic pressure on diaphragm 356 is also released at the time of rotation of cam 158 because of closing of valve 514. Movement of cam 158 permits the springs 344 to bias the plate 348 away from block 374 and thus relieving the pressure against element 437 to discontinue the pressure against the hydraulic fluid in the opposite chamber of unit 404.

The gear 116 is rotated with shaft 108 through the remaining arc of smooth segment 150 of disc 149 until the notch 151 moves into proximity with projection 56 whereupon the outer extremity thereof is engaged by disc 148 thereby rotating the teeth of toothed section 52 of gear 50 into intermeshing relationship with the teeth 148 of central section 146 of gear 116 so that continued rotation of gear 116 causes gear 50 to be moved with the same.

Shifting of projection 528 of cam 176 into disposition engaging switch arm 182 of switch 188 causes arm 182 to be swung into engagement with contact 530 whereupon timer motor 502 is reenergized through line 588, closed switch 188, line 614 and line 612. Operation of motor 502 causes cam 504 to close timer motor holding switch 532 so that opening of switch 188 as projection 528 moves out from under switch arm 182, does not interfere with continued operation of motor 502. However, as soon as the depression 518 of cam 172 has been rotated into a position, as illustrated in FIG. 16, receiving switch arm 178 of switch 184, the holding circuit to motor 126 is broken and thereby deactivating the field windings of motor 126. The brake 128 is applied at substantially the same instant because of shifting of projection 552 into a location closing switch 536, it being noted that motor 502 is continuing rotation by virtue of the holding circuit provided by switch 532.

The motor 126 is deactivated when the brewing chamber 252 is facing directly downwardly as shown in FIG. 14, whereupon the switch 538 is closed by cam 510 to thereby energize the coil 600 of solenoid 516 and effecting opening of water valve 514. The hot water from line 72 flows through passages 250 and 270 in member 38 and element 264 respectively, to thereby flush the coffee grounds from recess 260 and causing the same to be deposited in a suitable waste receptacle below apparatus 20.

During the initial movement of gear 116 after brewing of the coffee as outlined above, the cam 152 of gear 116 is rotated into disposition whereby the follower 210 on arm 208 is permitted to move along the depressed cam surface 154b and thus causing cam arm 208 to be rotated in a counterclockwise direction viewing FIG. 2, under the influence of spring 212. As arm 208 is swung to the left, the crankshaft 204 is rotated therewith to cause the section 230 thereof to shift roller 236 into contacting relationship with roller 216. Inasmuch as the roller 216 is driven by gear 50 through chain 198 trained over sprocket wheels 62 and 196 respectively, it can be seen that the filter paper 456 is forced into engagement with roller 216 by roller 236 whereby the filter paper is advanced by roller 216 throughout the time that follower 210 is disposed within recessed portion 154b of cam surface 154. The strippers 220 and 240 prevent the filter paper from wrapping around rollers 216 and 236 and assure that the paper is delivered to the waste tank below apparatus 20 notwithstanding the fact that such paper is in a wet condition from a prior brewing cycle. It is also to be pointed out that only sufficient paper is advanced by rollers 216 and 236 during each cyclic brewing operation, to cover the recess 260 in drum 84 so that a large number of cups of coffee may be brewed with apparatus 20 without the necessity of frequently changing the roll of filter paper 448.

As soon as the cam 510 has returned to the original disposition thereof, as shown in FIG. 16, the flow of water to flush coffee grounds out of recess 260 is discontinued and motor 502 is deactivated by virtue of opening of holding switch 532 as switch arm 542 moves into depression 540 in cam 504.

The scraper paddle 492 disposed in a position with the flexible member 494 engaging the periphery of drum 84, serves to remove all coffee grounds from the outer surface of the drum immediately prior to its passage under dispensing device 478 so that wet coffee grounds will not contaminate the ground coffee contained in the dispenser and which is delivered into the chamber 252 in drum 84.

In order to permit cleaning of brew assembly 162, the latter may be removed from frame 312 by simply shifting members 332 upwardly against the action of coil springs 344 until the lower extremities of members 332 clear arms 314 of frame 312, whereupon, the shank portions 342 of bolts 338 may be shifted laterally through corresponding notches 328 until assembly 162 is completely free of arms 314. The brew block 322 may be removed from plate 348 if desired, by unscrewing screw 400 from bracket 396 whereupon block 374 may be shifted laterally until the margins 372 thereof clear support elements 370 on flanges 366 of member 348. The components thereof may be disassembled in an obvious manner for more complete cleaning if desired, and it can readily be seen that the various members may be disassembled, cleaned and reassembled in a very short period of time.

The quantity of ground coffee delivered to recess 260 of chamber 252 may be varied as desired, by adjusting the disposition of element 264 in chamber 252. Such adjustment may be accomplished by removing clip 278 followed by rotation of nut 276 in a direction to move element 264 either toward brew assembly 162 or member 38, depending upon whether it is desired for more or less ground coffee to be introduced into chamber 252.

Having thus described the invention, what is claimed as new and desired to be secured by Letters Patent is:

1. In beverage brewing apparatus, the combination of: beverage material dispensing means; brewing liquid supply means; rotatable structure having recess means therein disposed to receive said material and said liquid from said dispensing means and said supply means respectively when said structure is in different angular positions of rotation thereof relative to said dispensing means and said supply means; power means operably coupled to said structure for rotating the latter successively into said positions thereof; a material support element shiftably mounted in said recess means for movement axially of the structure and provided with a liquid passage therethrough for conveying liquid from the dispensing means to the outwardly facing portion of said recess means; manually operable adjustment means on the structure and engaging the element for shifting the element axially of the structure within said recess means in response to manual actuation of the adjustment means to permit selective variation of the amount of said material which may be received in said recess means; and control means operably coupled with said power means and said liquid supply means for controlling the operation thereof in cooperative relationship.

2. In beverage brewing apparatus, the combination of: beverage material dispensing means; brewing liquid means; rotatable structure provided with recess means in the outer periphery thereof for receiving a quantity of said material and said liquid from said dispensing means and said supply means respectively when said structure is in different angular positions of rotation thereof relative to said dispensing means and said supply means; power means operably coupled to said structure for rotating the latter successively into said positions thereof; a material support element shiftably mounted in said recess means for movement axially of the structure and provided with a liquid passage therethrough for conveying liquid from the dispensing means to the outwardly facing portion of said recess means; manually operable adjustment means on the structure and engaging the element for shifting the element axially of the structure within said recess means in response to manual actuation of the adjustment means to permit selective variation of the amount of said material which may be received in said recess means; and control means operably coupled with said power means and said liquid supply means for rotating the structure into successive positions thereof at predetermined intervals and for supplying a predetermined amount of liquid thereto.

3. Beverage brewing apparatus as set forth in claim 2, wherein said power means is operably coupled to said structure axially thereof.

4. Beverage brewing apparatus as set forth in claim 3, wherein said structure comprises a rotatable, generally cylindrical drum provided with a recess on the outer cylindrical surface thereof for receiving said material and said liquid supply means is connected to said drum axially thereof.

5. In beverage brewing apparatus, the combination of: beverage material dispensing means; brewing liquid supply means; shiftable structure disposed to receive said material and said brewing liquid from said dispensing means and said supply means respectively when said structure is in different positions thereof; power means operably coupled to said structure for successively shifting the latter into said positions thereof; shiftable filter means having a portion thereof engageable with said structure in overlying relationship to said material when the brewing liquid is passed therethrough; and control means operably coupled with said power means, said liquid supply means and said shiftable filter means for shifting the structure into said positions thereof at predetermined intervals, for supplying predetermined amounts of liquid thereto and for shifting the filter means at selected intervals to provide a fresh portion of said filter means in overlying relationship to said material each time said structure is moved into a position where brewing liquid is supplied thereto.

6. Beverage brewing apparatus as set forth in claim 5, wherein said filter means includes a supply of elongated filter paper.

7. Beverage brewing apparatus as set forth in claim 5, wherein is provided means for clamping said portion of the filter means into firm engagement with said structure in overlying relationship to said material therein for forcing all of the liquid supplied to said structure to flow through said filter means.

8. Beverage brewing apparatus as set forth in claim 5, wherein said control means includes mechanism for shifting said filter means as the structure is shifted from the position thereof where brewing liquid is supplied thereto.

9. In beverage rotatable brewing apparatus, brewing drum structure having a cylindrical outer peripheral surface provided with transaxially extending recess means therein for receiving a quantity of solid brewing material, said structure being rotatable about the axis of said surface through predetermined arcs to bring said recess means into and through a plurality of successive positions; power means operable coupled to said structure for rotating the latter; means independent of said structure disposed to introduce a predetermined amount of said solid material into said material receiving recess means in the structure while the latter is in a second position thereof; brew assembly means located radially of said structure and shiftable toward and away from said surface of the structure while the latter is in said second position thereof and normally positioned away from the structure, said brew assembly means cooperating with said material receiving recess means in the structure to present a beverage brewing chamber; means connected to said brew assembly means for shifting the latter into liquid-tight engagement with said surface of the structure after the latter has been moved to said second position; means operably coupled to said structure for directing liquid through the solid material in said brewing chamber to thereby produce a quantity of said brewed beverage; and control means operably coupled to said power means, said means for shifting the brew assembly means and said liquid supply means for shifting the structure into said positions thereof at predetermined intervals, for maintaining the structure at certain of said positions for predetermined intervals, for shifting the brew assembly means into and out of engagement with the structure only while the latter is in said second position thereof, and for supplying a predetermined amount of liquid to said structure at said one position of the same.

10. In beverage brewing apparatus, brewing structure having means therein for receiving a quantity of solid brewing material, said structure being shiftable into and through a plurality of positions; power means operably coupled to said structure for shifting the latter; means disposed relative to said structure for introducing a predetermined amount of said solid material into said material receiving means in the structure while the latter is in one of the positions thereof; brew assembly means shiftable toward and away from the structure while the latter is in a second position thereof and normally positioned away from the structure, said brew assembly means cooperating with said material receiving means in the structure to present a beverage brewing chamber; means connected to said brew assembly means for shifting the latter into liquid-tight engagement with the structure after the latter has been moved to said second position; shiftable, expendable filter means placed between said brew assembly means and the structure when the brew assembly means is shifted into engagement with said structure; means operably coupled to said structure for directing liquid through the solid material in said brewing chamber to thereby produce a quantity of said brewed beverage; and means for replacing the filter means with a different filter means each time the brew assembly means is shifted into engagement with said structure.

11. Beverage brewing apparatus as set forth in claim 10, wherein said filter means includes an elongated filter strip and filter replacement means includes filter advancement mechanism receiving said strip for disposing a fresh portion of the latter between said brew assembly means and the structure each time the brew assembly means is shifted into engagement with said structure.

12. Beverage brewing apparatus as set forth in claim 11, wherein said filter strip comprises elongated filter paper stored in roll form adjacent said structure, said filter advancement mechanism successively unrolling predetermined stretches of said paper from the roll thereof each time said brew assembly means is shifted away from said structure.

13. Beverage brewing apparatus as set forth in claim 9, wherein said means for shifting the brew assembly means includes spring means normally biasing the brew assembly means away from and out of contacting relationship to said structure, and means engageable with said brew assembly means for forcing the brew assembly means into liquid-tight engagement with said structure and against the action of said spring means.

14. Beverage brewing apparatus as set forth in claim 13, wherein said means for forcing the brew assembly means into tight engagement with the structure includes a cam engageable with said brew assembly means and means operably coupling said cam to said power operated means for movement by the latter in synchronization with movement of the structure to said second position thereof.

15. Beverage brewing apparatus as set forth in claim 13, wherein said means for forcing the brew assembly means into tight engagement with the structure includes hydraulically actuated means operatively associated with said brew assembly means and operable in response to flow of liquid into said means for receiving material in said structure.

16. Beverage brewing apparatus as set forth in claim 13, wherein said means for forcing the brew assembly means into tight engagement with the structure includes a cam engageable with said brew assembly means, means operably coupling said cam to said power operated means for movement by the latter in synchronization with movement of said structure to said second position thereof, and hydraulically actuated means operatively associated with said brew assembly means and cooperating with said cam to assure engagement of the brew assembly means with said structure in liquid-tight relationship thereto.

17. Beverage brewing apparatus as set forth in claim 13, wherein said means for forcing the brew assembly means into tight engagement with the structure includes hydraulically actuated means operatively associated with said brew assembly means and including mechanism for directing the brew assembly means into engagement with the structure under a pressure greater than that of the liquid introduced into the material receiving means in said structure to produce said quantity of beverage.

18. Beverage brewing apparatus as set forth in claim 17, wherein said hydraulically actuated means includes a pressure transformer operably coupled to said liquid supply line for multiplying the pressure of the liquid through said liquid supply means and effecting application of such increased pressure to the brew assembly means to force the latter into liquid-tight sealing engagement with the structure.

19. In beverage brewing apparatus, brewing structure having means therein for receiving a quantity of solid brewing material, said structure being shiftable into and through a plurality of positions; power means operably coupled to said structure for shifting the latter; means disposed relative to said structure for introducing a predetermined amount of said solid material into said material receiving means in the structure while the latter is in one of the positions thereof; brew assembly means shiftable toward and away from the structure while the latter is in a second position thereof and normally positioned away from the structure, said brew assembly means cooperating with said material receiving means in the structure to present a beverage brewing chamber; spring means normally biasing the brew assembly means away from and out of contacting relationship to said structure; means connected to said brew assembly means for shifting the latter into liquid-tight engagement with the structure against the action of said spring means after the structure has been moved to said second position; mechanism for locking the structure against shifting movement when in said second position thereof, and as said brew assembly means is forced into tight engagement with the structure in overlying relationship to said means therein for receiving said brewing material; and means operably coupled to said structure for directing liquid through the solid material in said brewing chamber to thereby produce a quantity of said brewed beverage.

20. In beverage brewing apparatus, brewing structure having means therein for receiving a quantity of solid brewing material, said structure being shiftable into and through a plurality of positions; power means operably coupled to said structure for shifting the latter; means disposed relative to said structure for introducing a predetermined amount of said solid material into said material receiving means in the structure while the latter is in one of the positions thereof; brew assembly means shiftable toward and away from the structure while the latter is in a second position thereof and normally positioned away from the structure, said brew assembly means cooperating with said material receiving means in the structure to present a beverage brewing chamber; spring means normally biasing the brew assembly means away from and out of contacting relationship to said structure; means connected to said brew assembly means for shifting the latter into liquid-tight engagement with the structure against the action of said spring means after the structure has been moved to said second position, said means for forcing the brew assembly into liquid-tight engagement with the structure including a cam engageable with said brew assembly means and means operably coupling said cam to said power operated means for movement by the latter in synchronization with movement of the structure to said one position thereof; mechanism for locking the structure against shifting movement as said cam is moved by said power operated means into disposition forcing the brew assembly means into engagement with the structure and during movement of the cam to a location releasing said brew assembly means to permit said spring means to move the brew assembly means away from said structure; and means operably coupled to said structure for directing liquid through the solid material in said brewing chamber to thereby produce a quantity of said brewed beverage.

References Cited in the file of this patent

UNITED STATES PATENTS

| | | |
|---|---|---|
| 1,467,778 | Di Paola | Sept. 11, 1923 |
| 2,014,325 | Grilli | Sept. 10, 1935 |
| 2,879,811 | Parraga | Mar. 31, 1959 |
| 2,898,843 | Rockriver | Aug. 11, 1959 |
| 2,910,928 | Rota | Nov. 3, 1959 |
| 2,971,454 | Hill | Feb. 14, 1961 |

FOREIGN PATENTS

| | | |
|---|---|---|
| 780,996 | Great Britain | Aug. 14, 1957 |
| 1,238,694 | France | July 4, 1960 |